DE LOYD K. COOK.
VISE.
APPLICATION FILED MAR. 20, 1917.
1,250,092.
Patented Dec. 11, 1917.
2 SHEETS—SHEET 1.
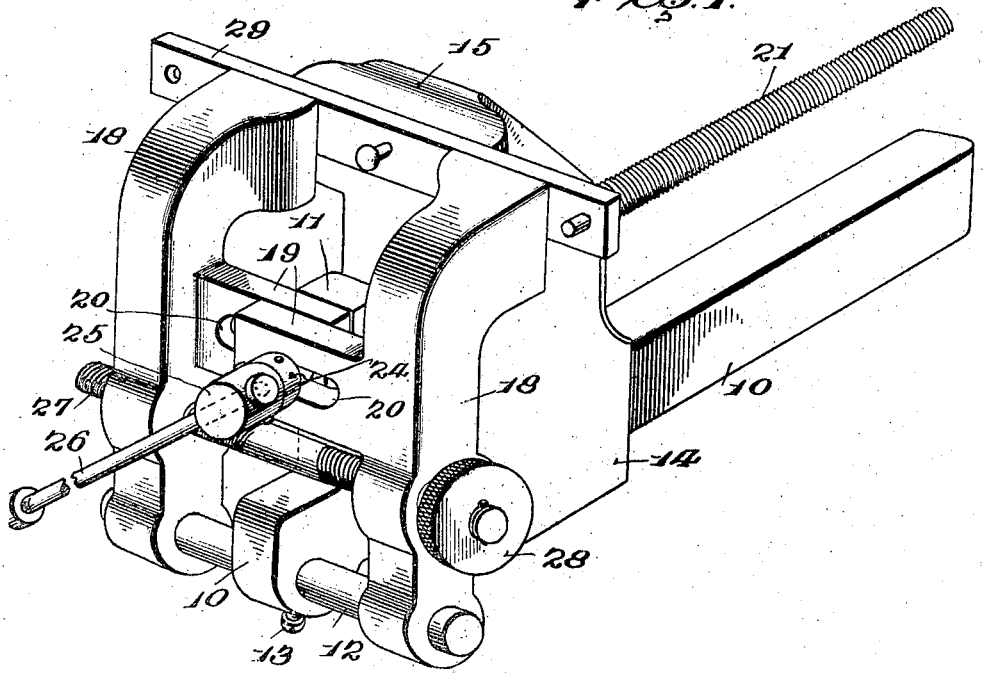
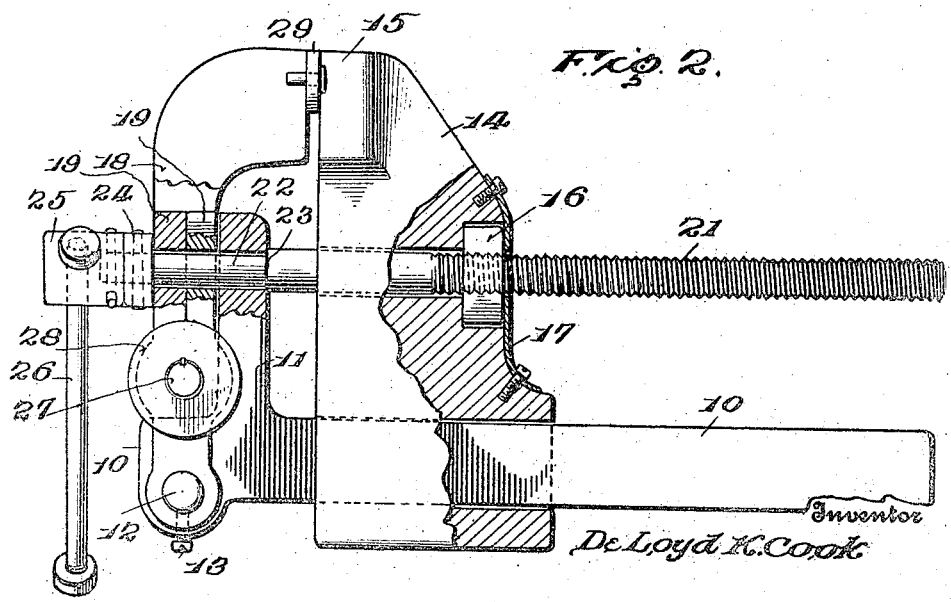
Inventor
DeLoyd K. Cook

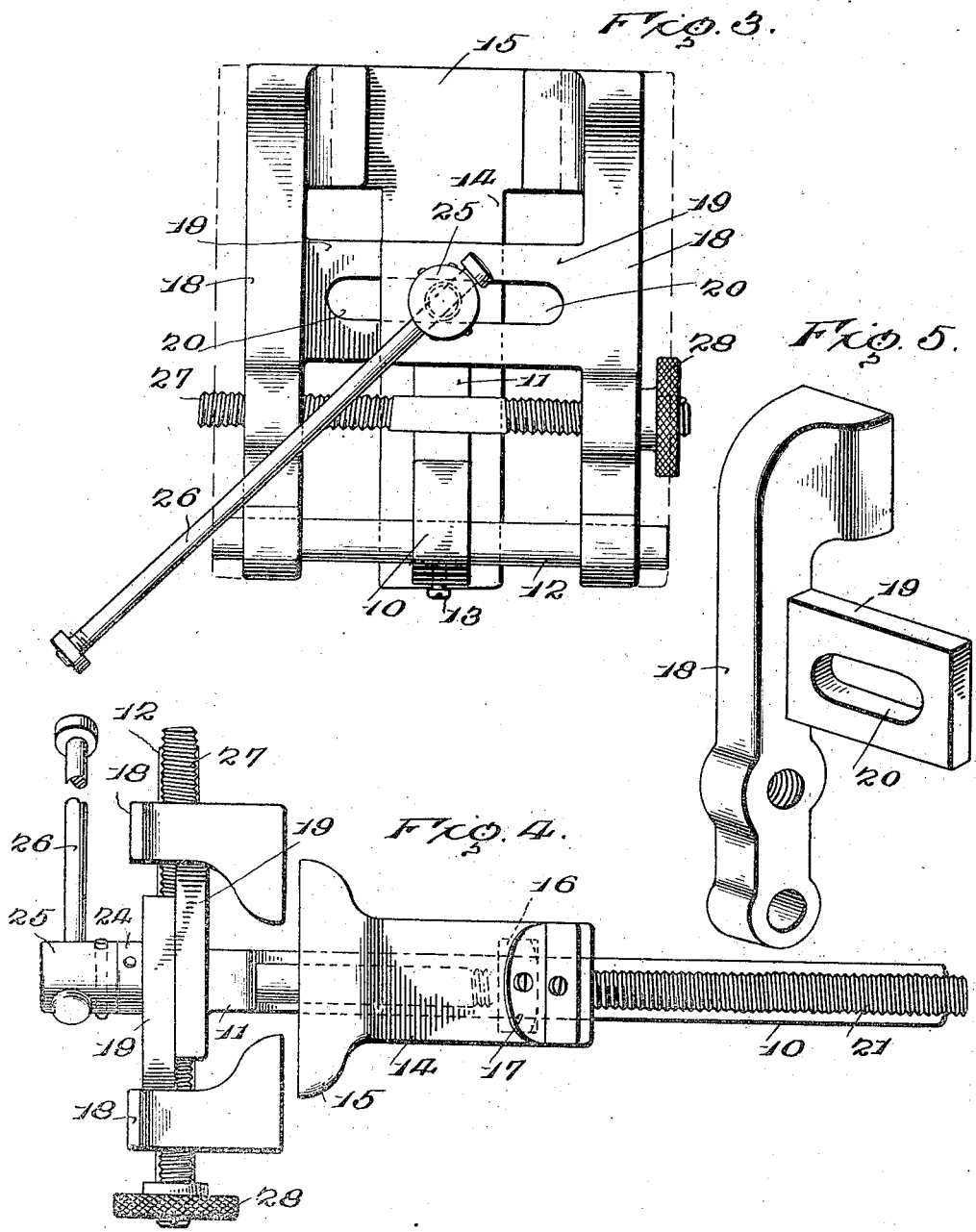
DE LOYD K. COOK.
VISE.
APPLICATION FILED MAR. 20, 1917.
1,250,092.
Patented Dec. 11, 1917.
2 SHEETS—SHEET 2.
Inventor
DeLoyd K. Cook

UNITED STATES PATENT OFFICE.

DE LOYD K. COOK, OF MAQUOKETA, IOWA.

VISE.

1,250,092.   Specification of Letters Patent.   Patented Dec. 11, 1917.

Application filed March 20, 1917. Serial No. 156,149.

*To all whom it may concern:*

Be it known that I, DE LOYD K. COOK, a citizen of the United States, residing at Maquoketa, in the county of Jackson and State of Iowa, have invented certain new and useful Improvements in Vises, of which the following is a specification.

This invention relates to an improved vise and has as its primary object to provide a device of this character wherein the working face of the vise will be open and unobstructed so that access may be easily had to the work held against the said face.

The invention has as a further object to provide a vise having a main jaw and coacting clamping jaws mounted at opposite sides of the plane of the main jaw and arranged to coact therewith so that the working face of the main jaw will be open and unobstructed between the clamping jaws.

The invention has as a further object to provide an arrangement wherein the clamping jaws may be simultaneously adjusted laterally with respect to each other for either increasing or decreasing the space between the said jaws and wherein the said clamping jaws may also be slidably adjusted simultaneously laterally in either direction with respect to the main jaw.

And the invention has as a still further object to provide an improved mounting for the clamping jaws of such nature that the said jaws will be rigidly supported against rocking movement with respect to the main jaw.

Other and incidental objects will appear as the description proceeds and in the drawings wherein I have illustrated the preferred embodiment of the invention and wherein similar reference characters designate corresponding parts throughout the several views:

Figure 1 is a perspective view of my improved vise particularly showing the arrangement of the coacting clamping jaws of the vise, Fig. 2 is a side elevation partly broken away and particularly illustrating the post formed on the stock of the vise for supporting the clamping jaws against rocking movement as well as the clamp screw employed for adjusting the clamping jaws and the main jaw of the vise relative to each other, Fig. 3 is a front elevation showing the manner in which the clamping jaws are arranged to coöperate with the main jaw of the device, Fig. 4 is a top plan view particularly illustrating the arrangement of the overlapping lateral lugs carried by the clamping jaws of the vise, and Fig. 5 is a detail perspective view showing one of the clamping jaws detached.

In carrying out the invention, I employ a stock 10, formed adjacent its forward extremity with an upstanding post 11. Fitted through the adjacent terminal of the stock is a jaw supporting rod 12 extending transversely with respect to the stock and connected therewith by a set screw or other suitable fastening device 13.

Slidably mounted upon the stock 10 is an upstanding main jaw 14 laterally enlarged at its upper extremity to form a working face or anvil 15. Formed in the rear side of the said jaw is a squared socket and removably fitted in the said socket, is a nut 16. Fitting over the socket for retaining the nut therein, is a plate 17 secured to the jaw by screws or other suitable fastening devices, the plate being formed with an opening to register with the opening in the nut.

Slidably mounted upon the rod 12 of the stock 10 are upstanding coacting clamping jaws 18, one of which is shown in detail in Fig. 5. These jaws are arranged at opposite sides of the stock 10 and, at their upper extremities, confront the anvil 15 of the jaw 14. Preferably, the upper terminals of the jaws 18 are laterally enlarged to extend inwardly toward the jaw 15 and thus present correspondingly increased bearing surfaces to the work. Formed on the inner sides of the said clamping jaws are coacting overlapping lateral lugs 19, the innermost of which confronts the upper extremity of the post 11. Formed in the said lugs are registering slots 20. Extending loosely through the jaw 14 to project through the opening in the plate 17, is a clamp screw 21 threaded through the nut 16. This screw, at its forward extremity, is provided with a reduced terminal 22 defining a shoulder 23 confronting the inner face of the post 11 with the said reduced terminal fitting loosely through the upper extremity of the said post and through the slots 20 in the lugs 19 of the clamping jaws. Mounted upon the outer extremity of the reduced terminal 22 of the said screw is a collar 24 secured to the screw by a pin or other suitable fastening device and arranged to confront the outermost of the lugs 19. Connected to the adjacent end of the clamp screw is a cap 25 and slidable through this cap is a handle 26.

It is now to be observed that the post 11 and collar 24 will hold the clamping jaws 18 against rocking movement upon the pin 12 with the said jaws thus rigidly supported to coöperate with the main jaw 14. By rotating the clamp screw 21, the clamping jaws may, as will be well understood, be slidably adjusted with respect to the main jaw or vice-versa depending upon whether or not the main jaw is held fixed, it being observed, in this connection, that when the clamp screw is turned to adjust the clamping jaws away from the main jaw, the shoulder 23 of the said screw will engage the post 11 for shifting the stock 10 outwardly upon the main jaw, while, when the clamp screw is turned to adjust the clamping jaws inwardly, the collar 24 will coöperate with the lugs 19 of the said clamping jaws for shifting the stock 10 inwardly upon the main jaw.

Fitted through the lower extremities of the clamping jaws 18 is a reversely threaded adjusting screw 27 extending transversely between the said jaws and mounted upon one end of this adjusting screw is a thumb nut 28 keyed or otherwise connected to the screw. Consequently, by rotating the nut 28, the clamping jaws may be simultaneously adjusted relative to each other to either increase or decrease the space therebetween and will also be correspondingly adjusted laterally with respect to the main jaw 14. In use, the work such as a bar, as conventionally shown at 29, is placed against the anvil 15 of the main jaw 14 when the clamp screw 21 is operated to shift the clamping jaws to engage the said bar. The clamping jaws 18 will thus hold the work against the main jaw 14 with the anvil 15 of the main jaw open and unobstructed between the clamping jaws so that easy access may be had to the work at the anvil and, as will be readily understood in view of the previous description, the clamping jaws may be adjusted with respect to each other to engage the bar either immediately over the anvil or at points spaced laterally with respect to the anvil.

Attention is now directed to the fact that since the slotted lugs 19 of the clamping jaws 18 slidably receive the clamp screw 21, these jaws may, by being connected by the adjusting screw 27, be slidably adjusted as a unit upon the rod 12 laterally in either direction with respect to the main jaw. Moreover, this simultaneous lateral adjustment of the clamping jaws may be accomplished without molesting the adjustment of the jaws with respect to each other. Accordingly, the clamping jaws and adjusting screw may be bodily shifted laterally with respect to the main jaw for adjusting the clamping jaws to engage at different points with the work, this adjustment being of advantage when it is desired to have one of the clamping jaws hold the work immediately at the anvil 15 with the other clamping jaw engaging the work at a point spaced from the anvil or when it is desired to position the clamping jaws longitudinally upon the work. In this connection it will be observed that, when the adjusting screw 27 is operated to adjust the jaws with respect to each other, the lugs 19 will engage the clamp screw 21 for limiting the jaws in their movement away from each other and prevent displacement of the jaws from the rod 12 and will also perform a similar function when the clamping jaws are slidably adjusted laterally as a unit upon the said rod.

It will, therefore, be seen that I provide a particularly simple and efficient arrangement for the purpose set forth, and a vise adapted to rigidly hold the work while, at the same time, the construction is such that the work will be exposed so that easy access may be had thereto at the anvil of the vise.

Having thus described the invention, what is claimed as new is:

1. A device of the character described including a stock, a post carried thereby, a main jaw mounted upon the stock, coacting loosely mounted clamping jaws carried by the stock to coöperate with the main jaw and operatively engaged with said post to be rigidly supported thereby against rocking movement toward the main jaw, and means between the main jaw and the clamping jaws for adjusting the said main and clamping jaws with respect to each other.

2. A device of the character described including a stock, a post carried thereby, a main jaw mounted upon the stock, coacting slidably mounted clamping jaws mounted in front of said post and arranged to coöperate with the main jaw, lateral lugs carried by the clamping jaws and engaging the post for rigidly supporting the clamping jaws against rocking movement toward the main jaw, and means for adjusting the main and clamping jaws with respect to each other, the clamping jaws being slidably shiftable laterally with respect to the main jaw.

3. A device of the character described including a stock, a post carried thereby, coacting slidably mounted clamping jaws arranged to coöperate with the main jaw, lugs carried by the clamping jaws and arranged to coöperate with the post for rigidly supporting the clamping jaws against rocking movement toward the main jaw, and means for adjusting the main and clamping jaws with respect to each other and extending through said lugs, the clamping jaws being laterally shiftable with respect to the main jaw.

4. A device of the character described including a stock, a post carried thereby, a main jaw mounted upon the stock, coacting slidably mounted clamping jaws arranged to coöperate with the main jaw, means carried by the clamping jaws and arranged to coöperate with the post for rigidly supporting the clamping jaws against inward rocking movement with respect to the main jaw, and means between the main and clamping jaws for adjusting the said jaws with respect to each other and engaged by said first mentioned means for limiting the clamping jaws in their outward sliding movement with respect to each other.

5. A device of the character described including a stock, a main jaw, coacting clamping jaws mounted at opposite sides of the plane of the main jaw and arranged to coact therewith, means upon the stock between the main and clamping jaws and operatively engaged with the clamping jaws for rigidly supporting the said jaws against rocking movement toward the main jaw, and means for adjusting the main and clamping jaws with respect to each other.

6. A device of the character described including a stock, a main jaw associated therewith, coacting clamping jaws carried by the stock to coöperate with the main jaw, and means connecting the said clamping jaws, the said means and the said clamping jaws being bodily shiftable as a unit in a direction across the working face of the main jaw.

7. A device of the character described including a stock, a main jaw associated therewith, coacting clamping jaws arranged to coöperate with the main jaw, the said clamping jaws being mounted to slide in a direction across the working face of the main jaw, and means connecting the said clamping jaws for simultaneous sliding movement and slidable therewith.

8. A device of the character described including a stock, a main jaw associated therewith, coacting clamping jaws carried by the stock to coöperate with the main jaw, the said clamping jaws being shiftable in one direction longitudinally of the stock and in another direction transversely of the stock, and means connecting said clamping jaws to move one in a direction with the other.

9. A device of the character described including a stock, a main jaw associated therewith, coacting clamping jaws arranged to coöperate with the main jaw, and means connecting the said clamping jaws for unitary movement in a direction across the working face of the main jaw and movable with the said clamping jaws, said means being operable for adjusting the clamping jaws with respect to each other.

In testimony whereof I affix my signature.

DE LOYD K. COOK. [L. S.]

Copies of this patent may be obtained for five cents each, by addressing the "Commissioner of Patents, Washington, D. C."